United States Patent
Breusch

Patent Number: 5,614,090
Date of Patent: Mar. 25, 1997

[54] FILTER CASING AND PIPE EXTENSION THEREFOR

[75] Inventor: Norbert Breusch, Sinsheim-Rohrbach, Germany

[73] Assignee: ARGO GmbH fur Fluidtechnik, Menzingen, Germany

[21] Appl. No.: 500,981

[22] PCT Filed: Jan. 6, 1994

[86] PCT No.: PCT/EP94/00023
§ 371 Date: Jul. 25, 1995
§ 102(e) Date: Jul. 25, 1995

[87] PCT Pub. No.: WO94/16793
PCT Pub. Date: Aug. 4, 1994

[30] Foreign Application Priority Data

Jan. 27, 1993 [DE] Germany .......... 43 02 161.1

[51] Int. Cl.[6] ............................................. B01D 35/02
[52] U.S. Cl. .................. 210/232; 210/460; 210/463; 210/541; 210/172
[58] Field of Search ................... 210/172, 416.4, 210/460, 463, 232, 541

[56] References Cited

U.S. PATENT DOCUMENTS

| | | | |
|---|---|---|---|
| 2,490,443 | 12/1949 | Knipper | 210/460 |
| 3,108,065 | 10/1963 | McMichael | 210/460 |
| 3,762,562 | 10/1973 | Okuniewski et al. | 210/460 |
| 3,762,565 | 10/1973 | Okuniewski et al. | 210/460 |
| 3,804,258 | 4/1974 | Okuniewski et al. | 210/460 |
| 3,833,124 | 9/1974 | Sugiyama et al. | 210/460 |
| 4,129,503 | 12/1978 | Joseph | 210/460 |
| 4,303,519 | 12/1981 | Del Vecchio | 215/460 |
| 4,411,788 | 10/1983 | Kimura | 210/460 |
| 4,420,396 | 12/1983 | Yamamoto et al. | 210/172 |
| 4,618,422 | 10/1986 | Sasaki et al. | 210/172 |
| 4,717,477 | 1/1988 | Nagashima | 210/416.4 |
| 4,743,370 | 5/1988 | Mizusawa | 210/460 |
| 4,853,125 | 8/1989 | Hanabusa | 210/172 |
| 4,874,510 | 10/1989 | Akira et al. | 210/460 |
| 5,441,637 | 8/1995 | Gutjahr et al. | 210/463 |

FOREIGN PATENT DOCUMENTS 2434076  2/1976  Germany .

*Primary Examiner*—Cynthia L. Nessler
*Attorney, Agent, or Firm*—Shenier & O'Connor

[57] ABSTRACT

A pipe extension for a filtering pot of a return filter has an outlet connection projecting from the filtering pot at its free end and a pipe secured to the outlet connection. An annular groove extending in circumferential direction is arranged at the outlet connection and an annular seal which does not protrude radially beyond the outer circumference of the outlet connection is inserted into the annular groove. Radially projecting, axially extending conical webs are provided at the outer circumference of the pipe connection in the region between the annular groove and the filtering pot and a pipe consisting of metal is pushed onto these webs, whereby the pushed-on pipe is expanded by the conically extending webs to achieve a secure seat. A bead reaching into the annular groove is introduced into the pushed-on pipe.

4 Claims, 1 Drawing Sheet

FILTER CASING AND PIPE EXTENSION THEREFOR

The invention relates to a filtering pot of a return filter according to the preamble to patent claim 1.

Filtering pots of this type are known from DE-A-24 34 076 or FR-A-2 397 130.

Return filters have been used for a long time for the filtration of hydraulic oils and these filters have a filter head attachable to a tank for hydraulic oil, a filtering pot on one side of the filter head, a detachably arranged cover on the other side and a filter element arranged to pass through the filter head and filtering pot. The hydraulic oil to be filtered passes through the filter element via an opening in the filter head and flows out of an outlet connection projecting from the free end of the filtering pot and back into the tank for hydraulic oil. To prevent the filtered, returning hydraulic oil from exiting out of the filtering pot above the level of hydraulic oil in the tank and thereby causing a disadvantageous formation of foam when impinging on the surface of the oil, an extension pipe is secured to the outlet connection and this allows the filtered hydraulic oil to flow directly into the oil already located in the tank as far as possible beneath the level of the hydraulic oil. In order to be able to use return filters of this type in tanks for hydraulic oil having different shapes and sizes it is necessary to secure extension pipes of different shapes and lengths to the outlet connection arranged on the filtering pot, e.g. by form-locking.

In known extension pipes, a plastic pipe consisting of PVC is, for example, heated, pushed onto the outlet connection of the filtering pot and secured with a conventional hose clip.

In other, known extension pipes, metal pipes are, for example, sealingly connected with the filtering pot by welding or soldering.

The object of the invention is to provide an extension pipe which can be mounted on the fully assembled filter and allows a connection of the extension pipe with an outlet connection of a filtering pot which is tight, secure and easy to handle. In this respect, an extension pipe for a filtering pot made from plastic is, in particular, intended to be created.

The object is accomplished in accordance with the invention by the characterizing features of patent claim 1.

BRIEF DESCRIPTION OF THE DRAWINGS

The following description of a preferred embodiment serves to explain the invention in greater detail in conjunction with the attached drawings. In the drawings.

DESCRIPTION OF THE PREFERRED EMBODIMENTS

Figure 1:
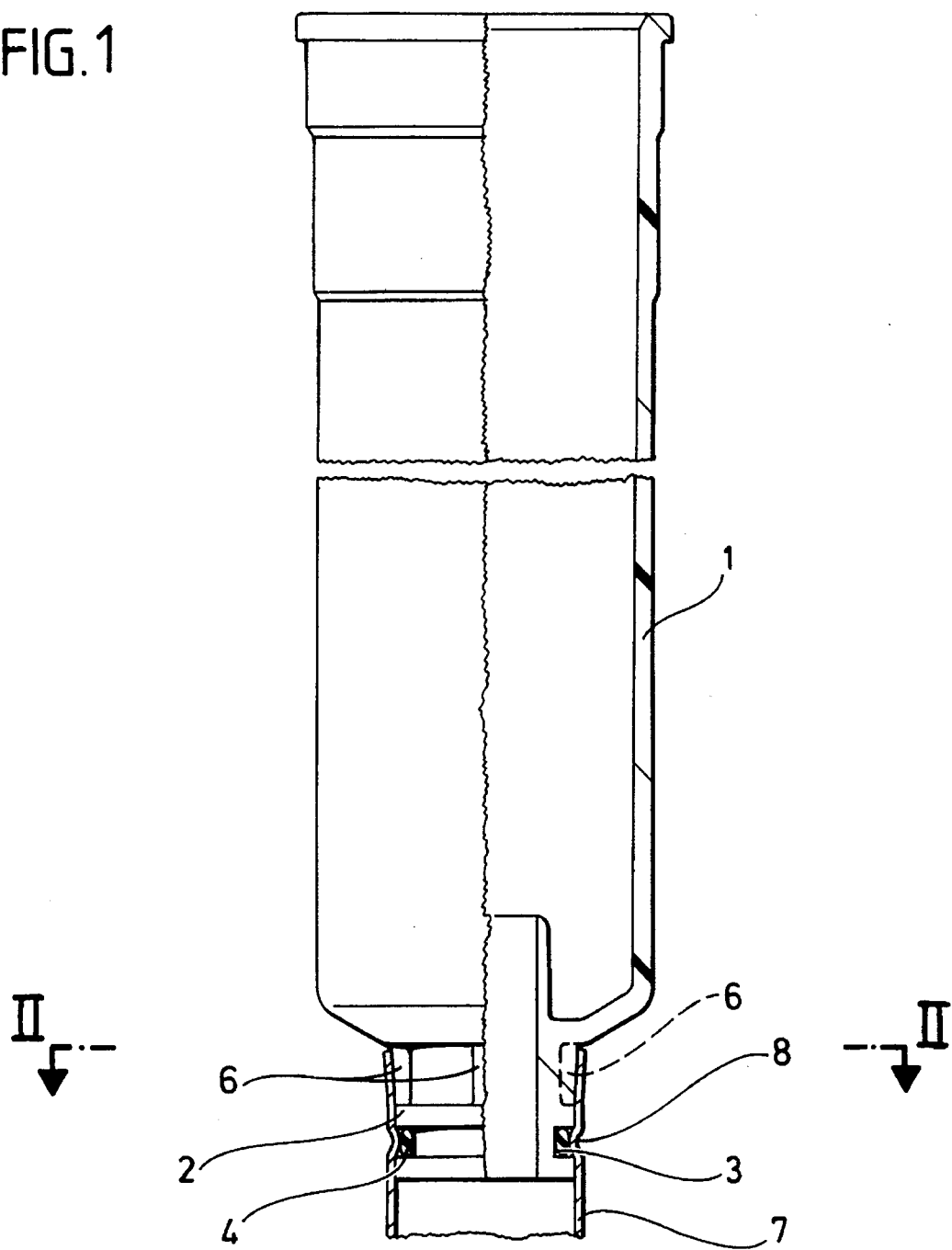
FIG. 1 is a partially cutaway illustration of a filtering pot with an inventive pipe extension and FIG. 2 is a sectional illustration along line II—II in FIG. 1.

As illustrated in FIG. 1, an outlet connection 2 is integrally formed on the free end of a filtering pot 1 made from plastic, this free end projecting into the interior, for example, of a tank for hydraulic oil. An annular groove 3 extending in circumferential direction is arranged at the outlet connection 2, adjacent to its free end face. An annular seal 4 known per se is inserted into the annular groove 3; this seal does not protrude radially beyond the outer circumference of the outlet connection 2.

Four radially projecting webs 6 are arranged at the outlet connection 2 in the region between the annular groove 3 and the lower end of the filtering pot 1. These webs extend in axial direction towards the annular groove 3 in a slightly conically tapering shape. The webs 6 are distributed symmetrically over the outer circumferential surface of the outlet connection 2. Instead of the four webs 6 illustrated, only three or more than four, for example, five or six webs can be provided.

Figure 2:
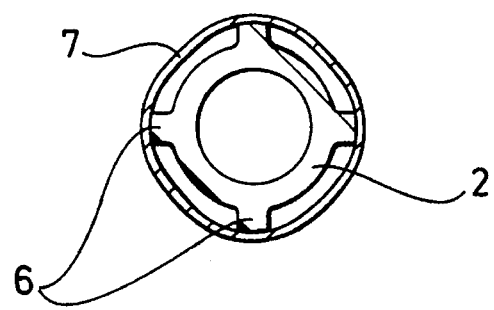

For securing the pipe extension, a relatively thin-walled pipe 7 consisting of metal, preferably of aluminum or an aluminum alloy, is pushed over the outlet connection 2. The pipe 7 is thereby expanded at its end pushed over the outlet connection 2 due to the conically ending webs 6 and deformed into an essentially square-shaped form having curved corners (FIG. 2). This deformation prevents any wobbling of the pipe 6 on the connection 2, caused by tolerances in the parts. A bead 8 extending annularly in circumferential direction and radially inwards is then produced in the pipe 7 pushed onto the outlet connection 2 and this bead reaches into the annular groove 3 to such an extent that a secure, radial sealing and attachment on the outlet connection 2 of the filtering pot 1 is achieved. This bead 8 exerts a radially inwardly directed pressure on the annular seal 4, whereby a sealing of the pipe 7 against the outlet connection 2 of the filtering pot 1 and an additional holding of the pipe 7 on the outlet connection are achieved.

It is particularly advantageous that, with the inventive pipe extension, the annular seal 4 does not protrude beyond the outer circumference of the outlet connection 2 and, therefore, the sawn-off end of the pipe 7, which has a sharp-edged rim due to the sawing, does not come into contact with the annular seal 4 when pushed onto the outlet connection 2 and thus cannot cut it or damage it in any other way. This reduces the manufacturing costs of the metal pipe 7 since its sawn-off end does not need to be bevelled.

Instead of the axially extending, conical webs 6, it is also possible to provide an axially extending cone which widens somewhat upwards towards the filtering pot 1 in the form of a conical surface complete in itself.

I claim:

1. A filter casing and pipe extension therefor including in combination a filter casing provided with a discharge outlet having an axis, the outlet having an outer surface at least portions of which are conically tapered from larger radii to smaller radii in the direction of discharge along the axis, the outlet terminating in two axially spaced cylindrical portions of equal outer radii separated by a circumferential groove of predetermined depth, the radii of the cylindrical portions being equal or greater than the smallest radius of the tapered portions, a sealing member disposed in the groove and having a radial thickness not greater than said depth, an extension pipe formed of a ductile metal and having an inner radius equal to or slightly greater than that of the cylindrical portions, and the pipe being provided with a circumferentially extending indentation, the construction being such that the pipe may be axially telescoped upon the outlet with the pipe indentation disposed in the groove in sealing engagement with the sealing member and the tapered portions deforming the pipe and enlarging at least portions of its inner radial dimensions.

2. Apparatus as defined in claim 1 wherein the extension pipe is formed of aluminum or an aluminum alloy.

3. Apparatus as defined in claim 1 wherein the tapered portions have the shape of radially projecting, axially extending conical webs.

4. Apparatus as defined in claim 1, wherein said outer surface is conical.

* * * * *